(12) United States Patent
Henderson et al.

(10) Patent No.: US 11,625,709 B1
(45) Date of Patent: *Apr. 11, 2023

(54) ASSURED PAYMENT SYSTEM USING DELAYED TRANSACTION QUEUE

(71) Applicant: Pushpay IP Limited, Auckland (NZ)

(72) Inventors: Alex Henderson, Auckland (NZ); Matthew Amidon, Redmond, WA (US); Leonie Wise, Auckland (NZ); Karl Prosser, Monroe, WA (US); Josh Robb, Auckland (NZ)

(73) Assignee: Pushpay IP Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,443

(22) Filed: May 26, 2021

Related U.S. Application Data

(63) Continuation of application No. 16/436,765, filed on Jun. 10, 2019, now Pat. No. 11,055,701.

(60) Provisional application No. 62/683,552, filed on Jun. 11, 2018.

(51) Int. Cl.
G06Q 20/36 (2012.01)
G06Q 20/24 (2012.01)
G06Q 20/32 (2012.01)
G06Q 20/40 (2012.01)
G06Q 20/02 (2012.01)

(52) U.S. Cl.
CPC .......... *G06Q 20/367* (2013.01); *G06Q 20/24* (2013.01); *G06Q 20/322* (2013.01); *G06Q 20/403* (2013.01); *G06F 2201/86* (2013.01); *G06Q 20/027* (2013.01); *G06Q 20/401* (2013.01)

(58) Field of Classification Search
None
See application file for complete search history.

*Primary Examiner* — Scott S Trotter
*Assistant Examiner* — Amit Patel
(74) *Attorney, Agent, or Firm* — Knobbe, Martens, Olson & Bear, LLP

(57) ABSTRACT

Systems and methods are provided for triggering delayed transaction processing when certain transaction gateway problems are detected across a number of transactions. To complete a given transaction, a processing system may coordinate transfer of funds in a manner that includes communications among multiple third-party systems, such as a tokenization service or token vault, a payment gateway, and a bank or credit card processor. When there are connectivity or other problems with one of these other systems, a system and associated methods are provided for selectively delaying a subset of transactions while still providing some assurance to the transaction requestor and recipient that the transaction will proceed.

18 Claims, 7 Drawing Sheets

| Gateway Name | Message(s) from Gateway to classify as Provider Error for Triggering Delayed Payments |
|---|---|
| XYZ Payments | An upstream error occurred while processing the transaction. Please try again |
| XYZ Payments | 3000 Processor Network Unavailable |
| XYZ Payments | Payment Server System Error |
| EZ Sale | Server Error. Please contact Support. (61) - Internal Network Error |
| EZ Sale | Unable to communicate with the payment system |
| EZ Sale | Error Communicating with Bank |
| ProcessorA | Card Issuer Unavailable |
| ProcessorA | No reply from processing host |
| MerchantPal | There was difficulty communicating with the payment system |
| MerchantPal | Error while talking to one of our backends. We have been notified of the problem. |
| PayCo | Server Error. Please contact Support. (12) - Message Timed-out at Host |
| PayCo | Server Error. Please contact Support. (19) - Error |
| QuickPay | Internal error REFID |
| QuickPay | TIMEOUT-RETRY |
| ... | ... |

*FIG. 4*

ASSURED PAYMENT SYSTEM USING DELAYED TRANSACTION QUEUE

CROSS-REFERENCE TO RELATED APPLICATION

This application is a continuation of U.S. application Ser. No. 16/436,765, filed on Jun. 10, 2019, and titled "ASSURED PAYMENT SYSTEM USING DELAYED TRANSACTION QUEUE", which claims the benefit of U.S. Provisional Application No. 62/683,552, filed Jun. 11, 2018, the entirety of which are each hereby incorporated herein by reference.

BACKGROUND

Online merchants or other companies accepting payments from consumers or end-users of websites or mobile applications often utilize payment gateways. A payment gateway is a service that authorizes credit card or direct payment processing for particular accounts, and may be provided by a bank or a specialized financial service provider, such as a payment service provider. Payment gateways connect a merchant to a bank or credit card processor, and may take input from a variety of different applications and route those inputs to the appropriate bank or processor. Accordingly, a payment gateway facilitates a payment transaction by the transfer of information between a payment portal (such as a website, mobile phone or interactive voice response service) and the front-end processor or acquiring bank. A single merchant may use multiple payment gateways depending on various factors of a particular transaction.

Payment tokenization is a process that includes replacing a credit card number or other primary account number (PAN) with a unique payment token that is restricted in its usage, such as being restricted to a specific device, merchant, transaction type or channel. Tokenization is used to help secure transactions made via online merchants, as well as via mobile wallets across various payment technologies, including NFC, QR Codes or Bluetooth Low Energy (BLE). A company that accepts payment via various methods, including credit cards or bank accounts, may use third-party tokenization services or token service providers (TSPs) to reduce the risk of card-on-file fraud that could result from the company storing PAN information itself. A TSP typically manages a token vault, such as a secure centralized server where PAN information is stored, along with tokens representing the specific account numbers, such that companies utilizing the TSP only store the tokens (rather than any PAN information). Data stored in the vault is used by the TSP to map incoming requests that include a token to the associated PAN. Token vaults typically comply with Payment Card Industry (PCI) specifications.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 is a representation of a table or other data structure that associates each of a number of gateways with one or more corresponding messages that may be received from the given gateway and that have been classified according to aspects of the present disclosure as provider errors for purposes of triggering delayed payments, as described herein.

DETAILED DESCRIPTION

Figure 1A:
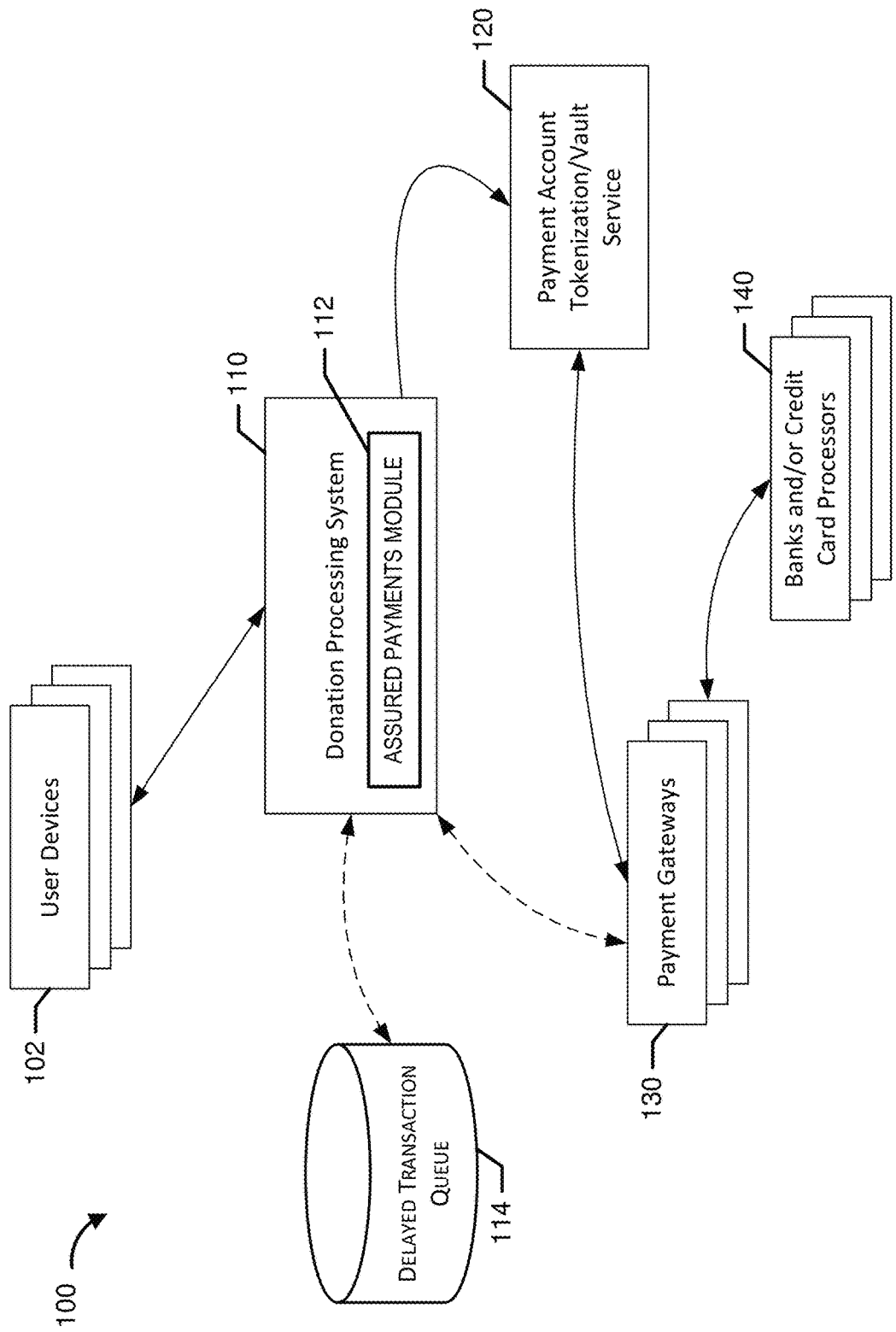
FIG. 1A is an illustrative operating environment for implementing aspects of the present disclosure, including a donation processing system that is in communication with other identified systems or devices over a network.

Generally described, aspects of the present disclosure relate to supporting seamless payment or donation experiences for a paying or donating end-user of a payment application (such as an application operating on a user's mobile device), while overcoming a number of potential back-end payment processing errors or delays that may occur across any of a number of downstream payment gateways, payment processors, or related service providers. In some embodiments, features described herein may be provided in association with a donation processing service that enables any of a potentially large number of users to submit monetary donations to any of a potentially large number of charitable entities or non-profit organizations. In some embodiments, completing a given transaction (such as a payment request or a donation request) may include a donation processing system, as described herein, coordinating transfer of funds via communication between multiple third-party systems, such as a tokenization service or token vault, a payment gateway, and a bank or credit card processor. When there are connectivity or other problems with one of these other systems, aspects of the present disclosure may provide solutions for assuring the transaction requestor and recipient that the transaction will nonetheless proceed despite the problem(s) encountered. Delayed payment features discussed herein are preferable to repeatedly attempting to complete a transaction that is experiencing downstream errors with a card processor or payment gateway, as such an alternative approach may have the unintended consequence of accidentally double-billing or triple-billing a cardholder (as well as causing a larger number of network requests to be sent, resulting in bandwidth inefficiencies).

According to prior art systems, when a user requests to initiate a transaction, such as a charitable donation to an identified recipient, an error or other problem encountered by the prior art system in attempting to process the donation in cooperation with one or more associated service providers (such as a payment gateway, tokenization service, card provider, or other system) would often result in the system canceling the donation request or otherwise reporting to the user that the donation failed. If transaction volumes are high at a time when a gateway or other service is unavailable or functioning improperly, transaction failures in such prior art systems may result in a particularly negative user experience (e.g., many users becoming frustrated with the donation system or associated application) and significant lost donation proceeds for the intended recipient organizations.

Two areas in which problems, errors or failures may occur in a transaction process are (1) in association with a tokenization service and (2) in association with a particular payment gateway. Aspects of the present disclosure provide flexible solutions in association with both of these potential problem sources. As further described below, in one embodiment, a donation processing system may implement a method that includes receiving, over a network, transaction requests originating from client computing devices. These requests may include some requests that will be processed via a first gateway (due, for example, to the underlying bank or credit card provider associated with the transaction) and other requests designated for different gateways. The method includes, in one example, determining that a threshold number of errors for transactions submitted to the first gateway have occurred within a threshold time period, and in response temporarily enabling delayed processing for transactions that use the first gateway. While delayed processing is enabled for the first gateway, new incoming transaction requests continue to be submitted by the donation processing system for processing via the second gateway (or a third, or fourth, etc.), but new transaction requests for processing via the first gateway are placed in a queue for delayed processing. After a time delay, the donation processing system may initiate an automated test transaction via the first gateway. If the test transaction is successful, the donation processing system may then submit transaction requests from the queue to the first gateway for processing, and may disable delayed processing for the first gateway for subsequent transaction requests received by the donation processing system.

While features are described below with respect to detecting problems with a gateway, in other embodiments, problems may be detected (and delayed transaction processing subsequently enabled with respect to) providers or entities other than gateways, such as a particular card brand, merchant facility, payment method, or payment network response code. Furthermore, while the example of a donation processing system is often used herein, it will be appreciated that aspects of the present disclosure provide utility in association with payments other than donations, and the disclosure is not intended to be limited to use in association with charitable donations. For example, delayed payment methods disclosed herein may be implemented, in some embodiments, in association with payment to a merchant in association with the purchase of goods or services, rather than as a donation. Furthermore, while real-time payment requests from users are used herein as an example, delayed payment features described herein may also be applied to scheduled payments (such as when a user sets up automated monthly payments to a certain recipient).

FIG. 1A is an illustrative operating environment for implementing aspects of the present disclosure, including a donation processing system 110 that is in communication with other identified systems or devices over a network. In the environment shown in FIG. 1A, users of the donation processing system 110 may utilize computing devices 102 (such as each user utilizing his or her own mobile device, such as a mobile phone, that operates an application distributed by an operator of the donation processing system 110, or displays a webpage generated in association with the donation processing system) to communicate with the donation processing system 110 via a communication network, such as the Internet or other communications link. While the network itself is not illustrated in FIG. 1A, each of the connections illustrated between the various numbered blocks of FIG. 1A may be via a network, such as any wired network, wireless network or combination thereof. In addition, the network in certain instances may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

As illustrated in FIG. 1A, each of the user devices 102 may communicate with the donation processing system 110, which includes an assured payments module 112. The assured payments module 112 may implement various aspects of the present disclosure, such as those described below with respect to FIGS. 2 and 3. The donation processing system may be in communication with a delayed transaction queue 114, or may include a delayed transaction queue as a component of the donation processing system itself. The donation processing system 110 may further be in communication with a payment account tokenization or vault service 120. The vault service 120 may be operated by a TSP with which an operator of the donation processing system has partnered with in order to avoid storing PAN information or other sensitive payment account data within the donation processing system or its associated data stores. As described above, the vault service may include a secure centralized server where PAN information is stored, along with tokens representing specific financial account numbers. Accordingly, the donation processing system may store one or more tokens associated with each of the users of user devices 102, which the donation processing system may have received from the vault service 120 as part of a registration process when the user signed up for an account with the donation processing system. Data stored by the vault service 120 may be used by the TSP operating the vault service to map incoming requests from the donation processing system that include a token to the associated PAN (such as a specific user's credit card).

The payment account tokenization or vault service 120, as well as optionally the donation processing system 110, may be in communication with a number of payment gateways 130. As described above, a payment gateway may be a service that authorizes credit card or direct payments processing for particular accounts, and may be provided by a bank or a specialized financial service provider, such as a payment service provider. Payment gateways may connect the donation processing system, such as via the vault service 120, to a bank or credit card processor, and may route the request to the appropriate bank or credit card processor 140. In some embodiments, the vault service 120 may provide a gateway and receiver service that utilizes various application programming interfaces (APIs) to complete transactions with third-party payment gateways and/or banks and credit card processors without the donation processing system 110 receiving card numbers or bank account numbers directly.

It will be appreciated that many aspects of the present disclosure provide advantages over prior art systems regardless of whether a vault service is used. For example, in other embodiments than that illustrated in FIG. 1A, the donation processing system may store payment account information in its own secure data storage, and may submit transaction requests directly to gateways without any intermediary token service.

Figure 1B:
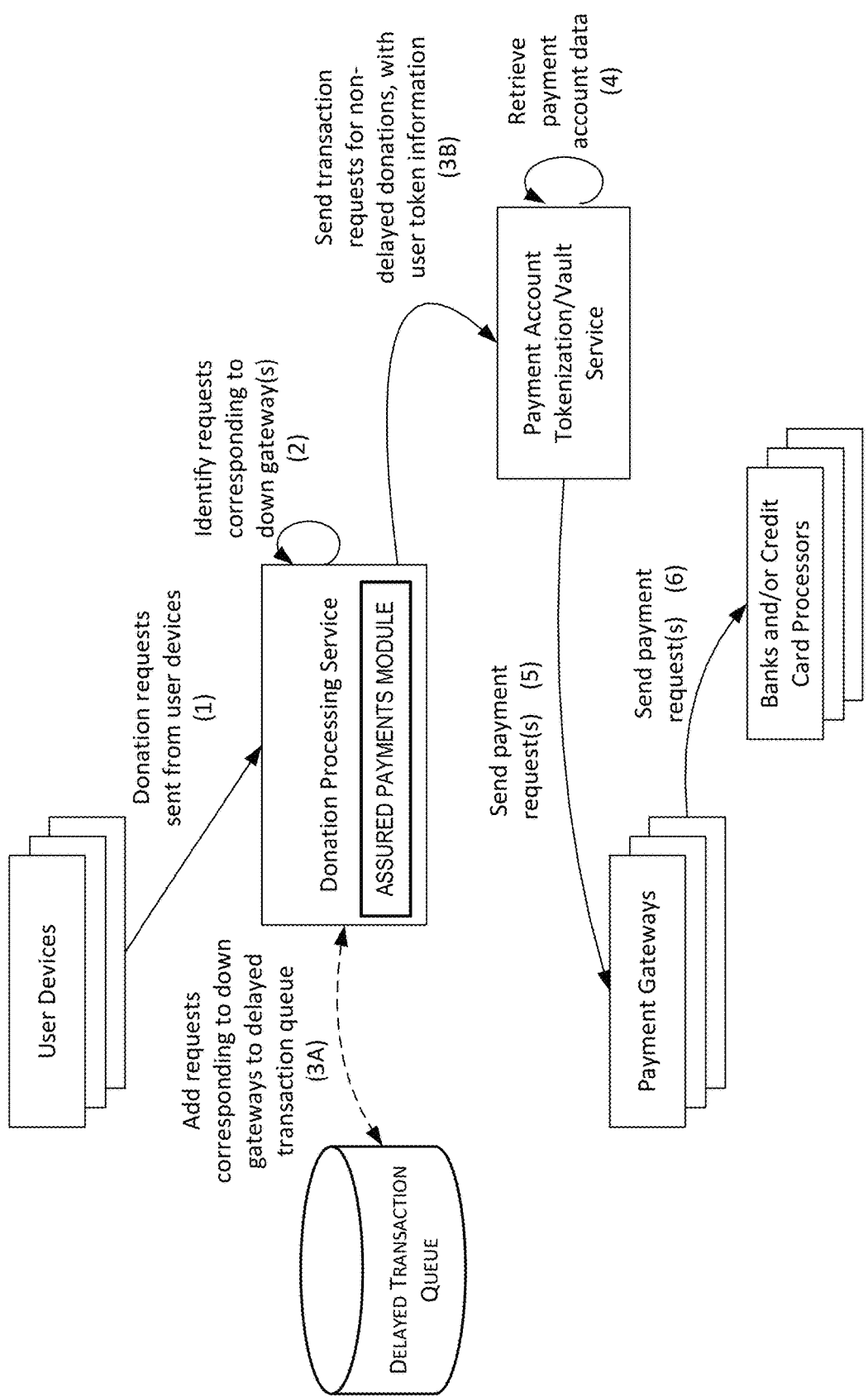
FIG. 1B depicts an illustrative data flow in the illustrative operating environment of FIG. 1A.

FIG. 1B depicts an illustrative data flow in the operating environment of FIG. 1A. The illustrative data flow assumes that delayed payments are enabled for at least one gateway according to determinations that will be discussed further below. The illustrative data flow begins with (1) the various user devices sending donation requests to the donation processing service. In one example, the user devices may be mobile phones operating an application that enables users to select a church to which each user would like to donate a user-selected amount of money. The user devices may be geographically dispersed across a wide geographic area, and may provide donation options for a large number of different churches or other organizations. In one embodiment, each request may include, for example, information identifying the given user's account with the donation processing service (for which the user may have previously registered and set up payment account details via the token service utilized by the donation processing service or system), the intended recipient church or other organization, and a payment/donation amount.

As the donation processing service or system receives the incoming requests, the donation processing system (2) identifies the requests that correspond to a down gateway for which a delayed payment mode has been activated or enabled by the donation processing system. As will be discussed below, delayed payments may be enabled by the donation processing system for a given gateway when certain criteria has been met in association with recent transaction attempts using the given gateway. For example, delayed payments for a first gateway may have been previously enabled due to a threshold number of errors or failures occurring with respect to the first gateway in a threshold time period, such as two failures within a five minute period.

As the flow of requests is received by the donation processing system, the donation processing system may direct each request either to the delayed transaction queue (at step 3A) for requests corresponding to down gateways (e.g., gateways for which delayed transactions are currently enabled), or to proceed via a standard transaction flow for transactions associated with currently operational gateways. The standard payment flow as illustrated includes (3B) the donation processing system sending a request to the vault service that includes a previously generated token associated with the particular user's desired form of payment (e.g., a token representing a credit card number). In embodiments in which the vault service also serves as an intermediary to the gateways, the donation processing system may include the other transaction details at step 3B (e.g., may provide the payment amount and recipient information to the vault service). Next, the vault service (4) may retrieve the full credit card information or other payment account information using the token provided by the donation processing system, and (5) send a corresponding payment request to the appropriate gateway based on the particular account information. The payment gateway may subsequently (6) complete the transaction via the appropriate underlying bank or credit card processor.

Figure 2:
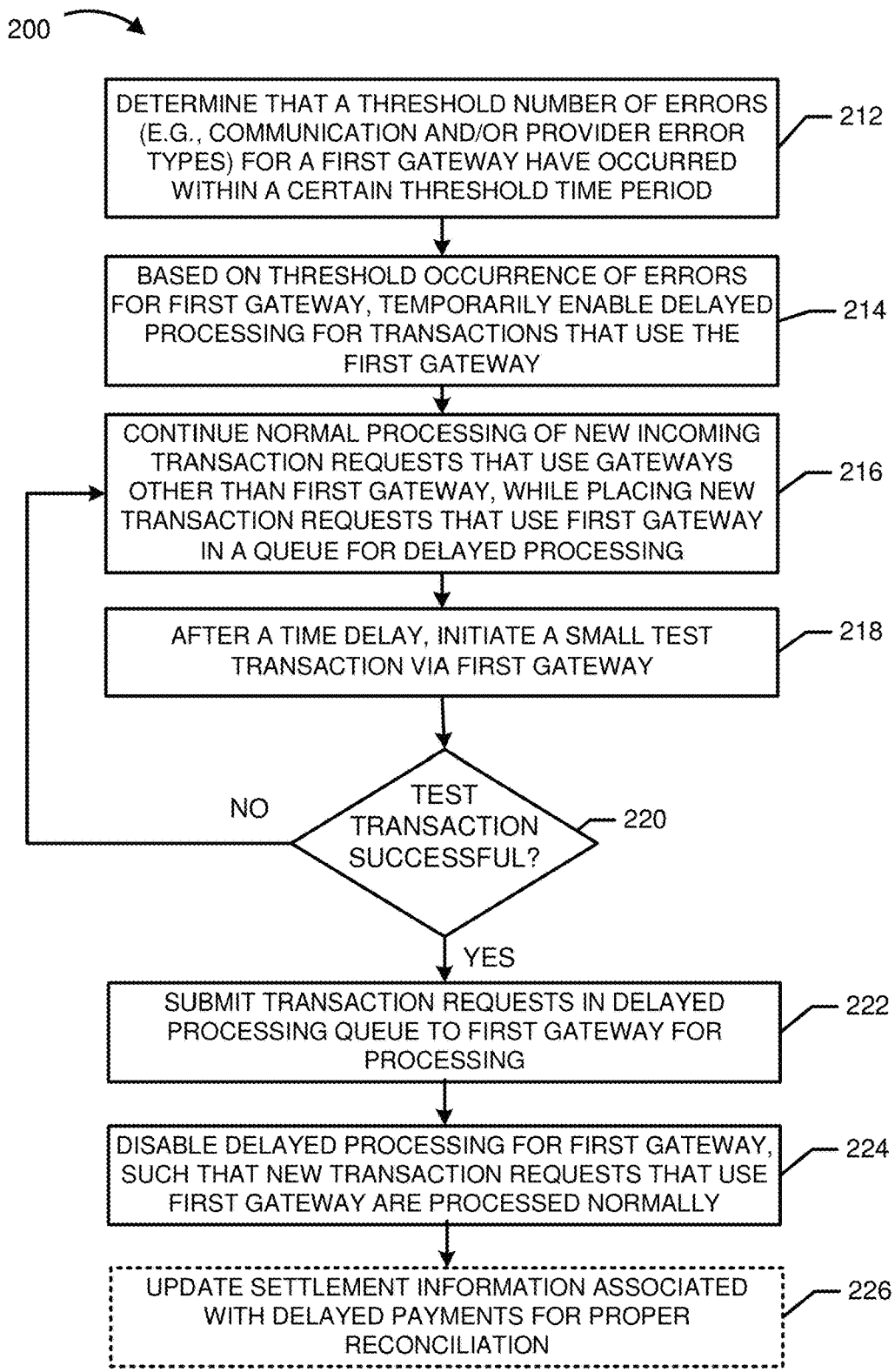
FIG. 2 is a flow diagram of an illustrative method for transaction processing using multiple gateways, including enabling delayed processing for one or more specific gateways.

FIG. 2 is a flow diagram of an illustrative method 200 for transaction processing using multiple gateways, including enabling delayed processing for one or more specific gateways. The illustrative method 200 may be performed by the assured payments module 112 of the donation processing system 110, in some embodiments. The method 200 begins at block 212, where the donation processing system may determine that a threshold number of errors (e.g., communication and/or provider error types) for a first gateway have occurred within a certain threshold time period. In one example, the threshold may be two errors of the same type (and with respect to the same gateway or provider) occurring within five minutes. However, it will be appreciated that a variety of different threshold criteria and time periods may be applied in different embodiments.

A communication error (which may alternatively be considered a network error) may refer to an error or failure that occurs in network communications somewhere between the donation processing system and a gateway. The donation processing system may be configured to identify a wide variety of communication errors, including network timeouts and various errors related to the Hypertext Transfer Protocol ("HTTP") and/or the Domain Name System ("DNS"). Other types of communication errors may be receiving incoherent data back from a gateway API, or receiving HTML data back instead of expected API results. On the other hand, a provider error may refer to a problem at a specific gateway or other provider determined from the data received back from the gateway, such as a message or error code. The donation processing system may maintain data mapping or designating various error codes or error messages from various gateways as provider errors (examples of which will be discussed with respect to FIG. 4 below). It will be appreciated that other payment problems, such as a transaction that fails due to lack of available funds or a credit card decline (or billing address validation failures, expired cards, incorrect Card Verification Value, etc.), may occur that are not designated as either communication or provider error types, and that would not count towards the threshold errors that may trigger delayed payments.

At block 214, based on the occurrence of the threshold number of errors for the first gateway, the donation processing system may temporarily enable delayed processing for transactions that use the first gateway. This may be considered "turning on" delayed transactions for the first gateway, in one embodiment. Accordingly, at block 216, the donation processing system may continue normal processing of new incoming transaction requests that use gateways other than first gateway (e.g., may continue submitting each such transaction for processing to the corresponding gateway), while placing new transaction requests that use the first gateway in a queue for delayed processing (such as delayed transaction queue 114). For delayed transactions, the data stored in the queue may include, in one embodiment, the transaction request time (e.g., the time that the user's request was received by the donation processing system), the requesting user (e.g., account identifier or username within the donation processing system), the payment method (e.g., an internal identifier for the specific payment account), the intended recipient, payment amount, and the gateway to which the transaction corresponds.

After a time delay (e.g., a predetermined amount of time after enabling delayed payments or entering block 216, such as ten minutes), the donation processing system may initiate an automated test transaction via the first gateway, at block 218. The test transaction may be for a small amount of money and made with a credit card or other account that is owned by an operator of the donation processing system (rather than attempting payment with a user's account). If the test transaction is not successful at decisional block 220 (e.g., another communication or provider error occurs), the method loops back to block 216 to continue the delayed transaction mode for the first gateway and wait before trying another test transaction. If the test transaction is instead successful at decisional block 220, the donation processing system proceeds to block 222.

At block 222, in response to the successful test transaction using the first gateway, the donation processing system begins submitting the queued transaction requests in the delayed processing queue to the first gateway for processing. The donation processing system also, at block 224, disables delayed processing mode (turns delayed processing off) for the first gateway for subsequent transactions received by the donation processing system, given that the first gateway appears to no longer be experiencing problems in view of the successful test transaction. Lastly, at block 226, the donation processing system may optionally update settlement information associated with the payments that had been delayed in order to implement a proper reconciliation process from an accounting perspective. For example, the donation processing system may implement various reconciliation steps that ensure the correct transaction date for each transaction is recorded in a transaction database, which may include adjustments based on time zone, holidays, various accounting and banking rules (e.g., treating a transaction differently if it occurred on a Saturday that was also the last day of a month), etc.

Figure 3:
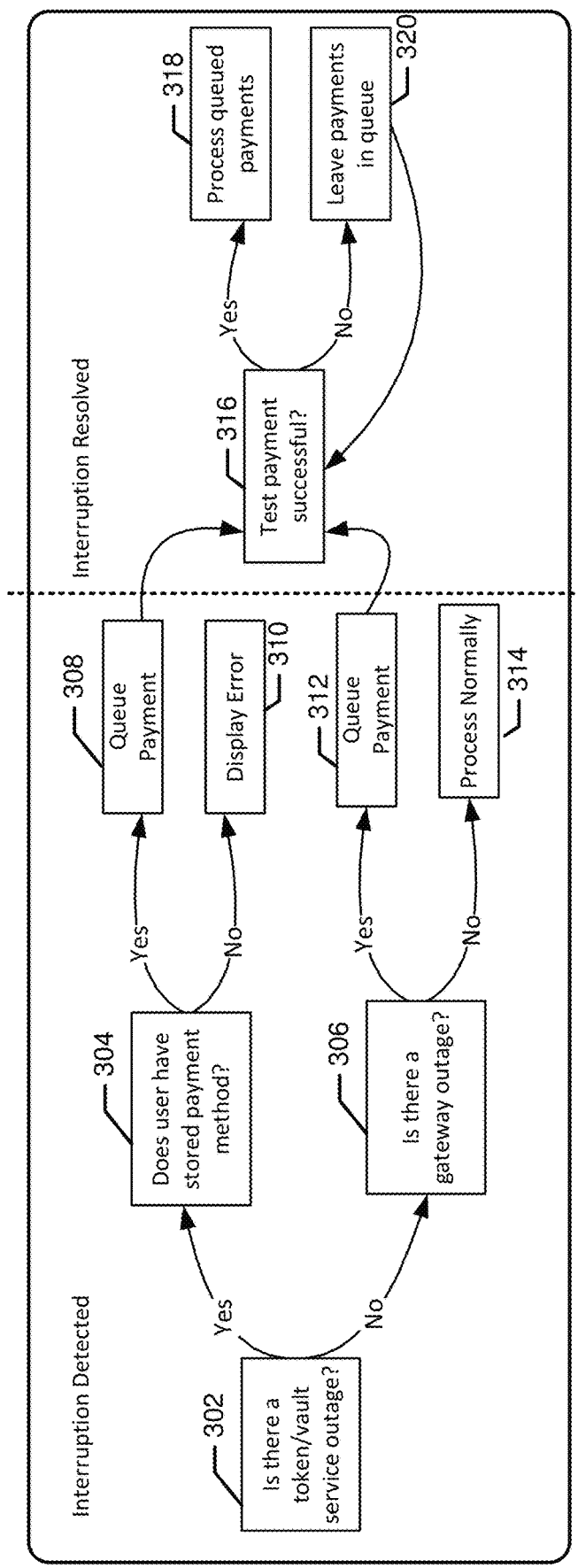
FIG. 3 is a high-level flow diagram illustrating various decisions and resulting actions when an interruption is detected and later resolved.

FIG. 3 is a high-level flow diagram illustrating various decisions and resulting actions when an interruption is detected by the donation processing system and later resolved. The various decisions may be performed by the assured payments module 112 of the donation processing system 110, in some embodiments. At block 302, the donation processing system determines whether there is an outage or problem with the token/vault service 120. This may include, for example, that the donation processing system cannot connect with the vault service over a network, such as the Internet, or that the vault service is returning an error message or other atypical response. If there is not a problem with the token service, the method proceeds to determine if there is a gateway outage associated with the gateway for the particular transaction, at block 306. If not, then the transaction continues to proceed as normal at block 314. However, if there is a gateway outage, the method proceeds to queue transactions for that gateway at block 312.

Returning to block 302, if there is a token service outage, the method determines whether a particular user that submitted the current transaction has previously stored payment information (e.g., has a credit card on file) with the token service, at block 304. If not, in embodiments in which the donation processing system is not configured to store or receive financial account information itself for security reasons, the donation processing system may display an error message at block 310. If the user does have stored payment information with the token service, the transaction is added to (stored in) the delayed transaction queue at block 308. When the token service is unavailable in other embodiments than that illustrated in FIG. 3, the user may be encouraged via one or more user interfaces to use a payment form that does not rely on the token service. For example, donation processing system 110 may temporarily alter its payment pipeline and associated user interfaces when the token service is unavailable to suggest or default to a form of payment such as an automated clearing house (ACH) payment, which electronically collects payment by directly debiting a checking or savings account of the user.

If a transaction has been placed in the delayed transaction queue, either at block 312 (for a gateway outage) or block 308 (for a token service outage), the donation processing system may subsequently try a test payment at block 316. Test payments have been described above. If the test payment is successful, the donation processing system may process queued payments at block 318. Otherwise, the donation processing system may leave the transactions in the queue, and return to block 316 to try a new test transaction after a time delay.

FIG. 4 is a representation of a table 400 or other data structure that associates each of a number of gateways with one or more corresponding messages that may be received from the given gateway and that have been classified according to aspects of the present disclosure as provider errors for purposes of triggering delayed payments. As illustrated, a given gateway may have multiple messages that may each be classified by the donation processing system as a provider error for that gateway. In addition, there may be a large number of different gateways that each have their own different error messages. The table 400 may be maintained by an administrator user of the donation processing system, and new messages or code may be added over time.

In some embodiments, error messages or other criteria may be added to the table 400 automatically by the donation processing system based on pattern analysis. For example, the donation processing system may utilize trend analysis and/or machine learning to detect failure modes automatically, even if operators of the donation processing system were not previously aware of the particular error or failure type. For example, some transaction failures may resemble typical transaction declines from a bank or credit card processor, but the donation processing system may detect that one or more aspects of the transaction do not match typical transaction patterns. The system may then flag such a transaction as a potential trigger for initiating delayed payments when one or more features or dimensions divert from a baseline transaction pattern. In some embodiments, the donation processing system may be configured to assign unclassified error messages (which, for example, may map to a different result code such as "Unknown Error" rather than "Provider Error"), the associated data of which may be used as input features for a hotspot detection model or other model configured to detect triggers to activate delayed transactions for a particular gateway.

In some embodiments, initiating a delayed transaction in a particular instance may be made for each individual transaction rather than setting all transactions for a given gateway to be delayed for some time period. For example, determining whether a given gateway can currently process an individual transaction (or if instead the transaction should be delayed) may be determined via a machine learning model in real time at the time the transaction request is received from a user. The model may accept as input multiple features, such as merchant, credit card provider or type, user information, currency, country, a payment result code, a card bin number, and/or others. One input feature may be a gateway response message itself (or fragments thereof, such as after removing variable content like identifiers or dollar amounts).

In some embodiments, particularly where an "Unknown Error" is infrequent, the system may be able to classify whether those errors are isolated to a single or small subset of users and/or merchants, and then take appropriate actions. For example, rather than delaying an entire gateway, if the system detects that all payments involving a particular merchant are failing, that might indicate gateway misconfiguration for the individual merchant rather than a gateway problem across all merchants. The donation processing system may then disable or delay payments for the individual merchant. If all payments from a particular user are failing but other users' payments are not failing, the system may be configured not to delay the payment gateway because this issue is likely with respect to a single user's card or other payment method. In some embodiments, models implementing the above functionality may be based at least in part on a clustering model and/or hotspot detection algorithm. In one embodiment, for example, the donation processing system may employ a k-nearest neighbors algorithm (k-NN) for one or more of the above classifications.

Figure 5:
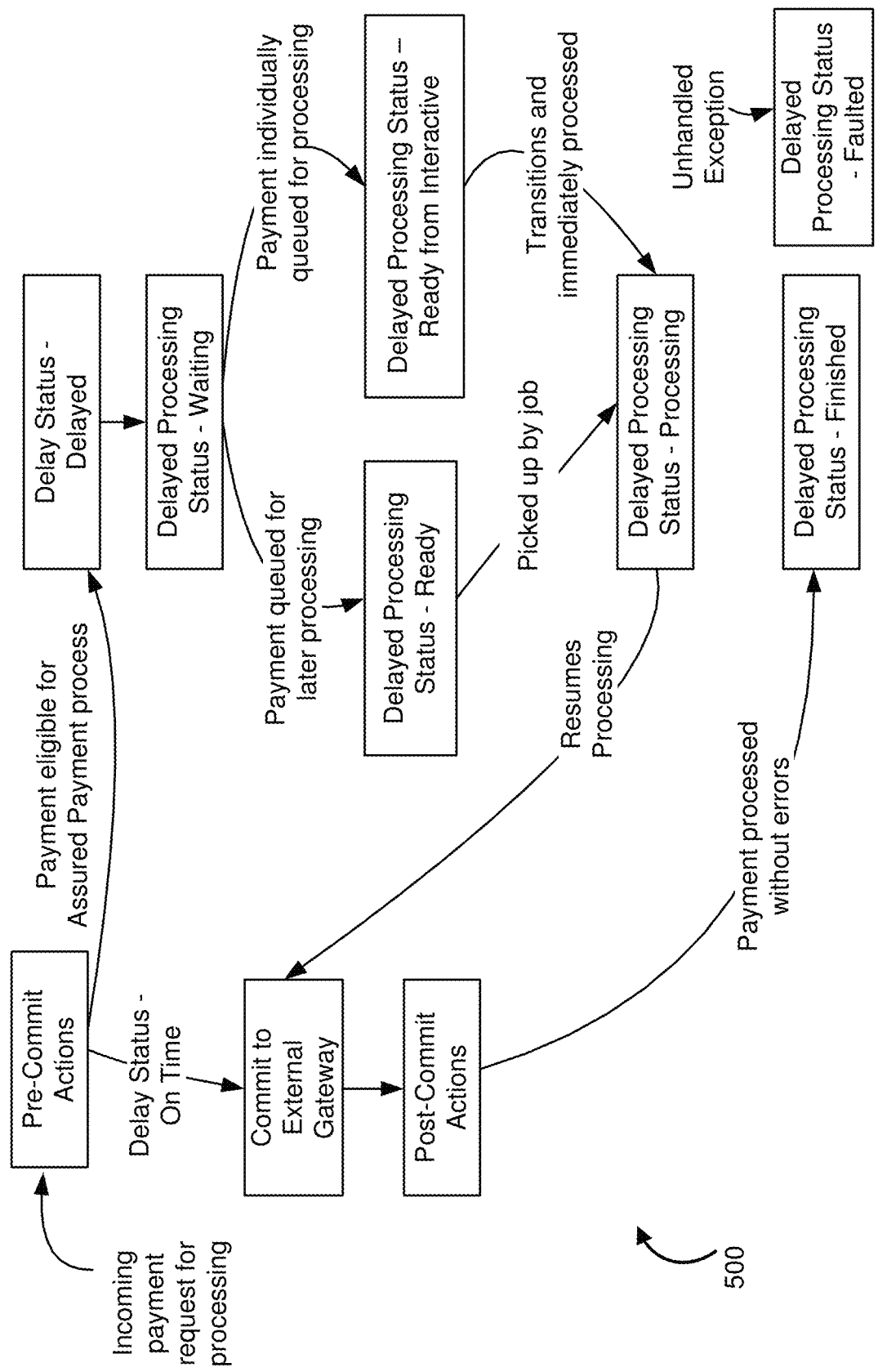
FIG. 5 is a flow diagram illustrating internal status changes for payments throughout a payment pipeline, including in association with a delayed processing queue.

FIG. 5 is a flow diagram 500 illustrating internal status changes for a payment throughout a payment pipeline, including in association with a delayed processing queue. As shown, a payment or transaction may be represented within the donation processing system throughout its lifecycle by statuses such as "delayed" (illustrated as "Delayed Status.— Delayed"), "waiting" (illustrated as "Delayed Processing Status—Waiting"), etc. The flow diagram 500 illustrates the actions that may occur that cause each subsequent status change for the transaction, according to one embodiment.

Figure 6:
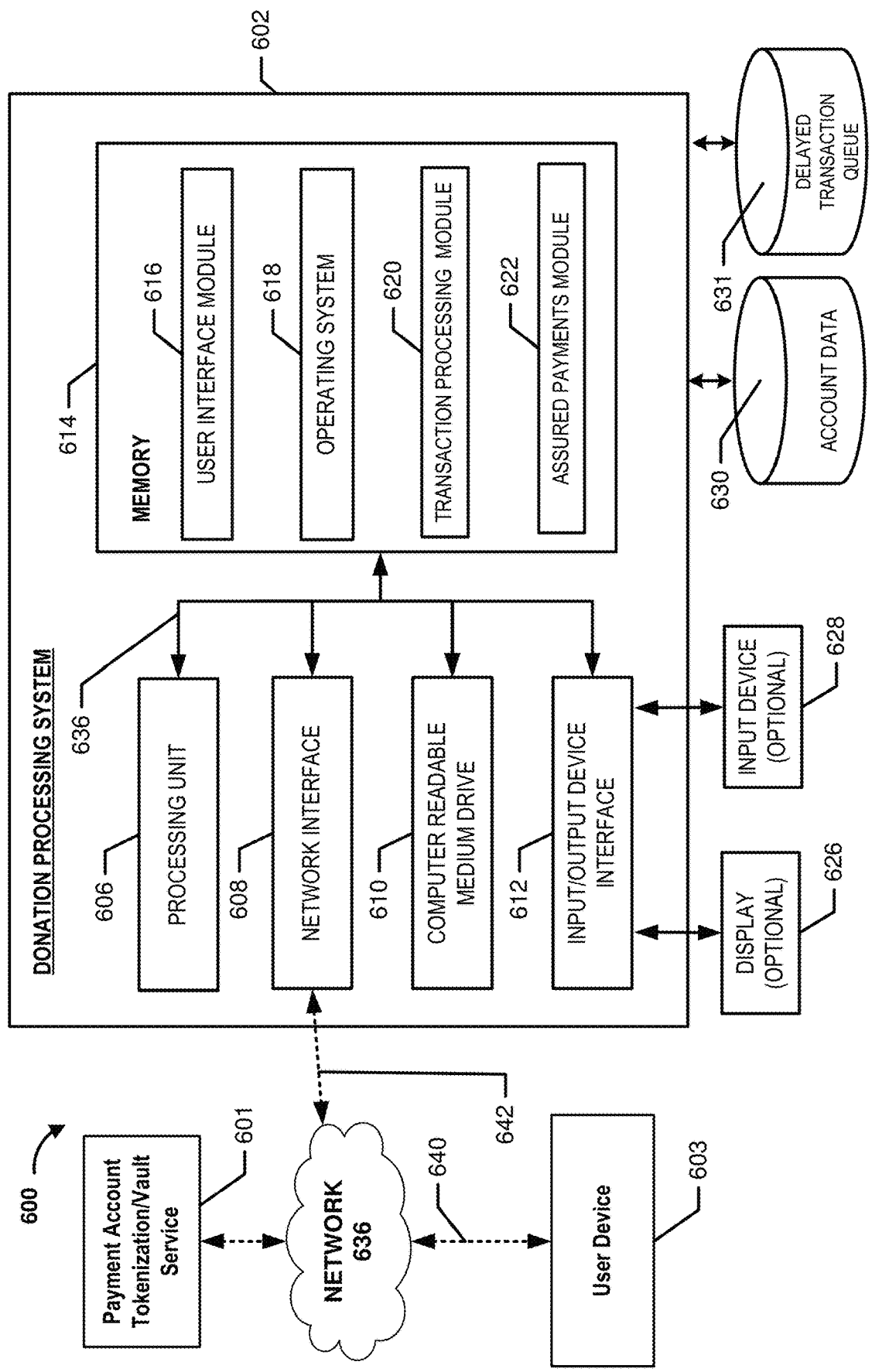
FIG. 6 is a system block diagram of a computing environment suitable for use in various embodiments of the present disclosure.

FIG. 6 illustrates a general architecture of a computing environment 600, according to some embodiments. As depicted in FIG. 6, the computing environment 600 may include a donation processing system 602, which may be the same as donation processing system 110 described above, and which is also referred to below as computing system 602. The general architecture of the computing system 602 may include an arrangement of computer hardware and software components used to implement aspects of the present disclosure. The computing system 602 may include many more (or fewer) elements than those shown in FIG. 6. It is not necessary, however, that all of these generally conventional elements be shown in order to provide an enabling disclosure.

As illustrated, the computing system 602 includes a processing unit 606, a network interface 608, a computer readable medium drive 610, an input/output device interface 612, an optional display 626, and an optional input device 628, all of which may communicate with one another by way of a communication bus 636. The processing unit 606 may communicate to and from memory 614 and may provide output information for the optional display 626 via the input/output device interface 612. The input/output device interface 612 may also accept input from the optional input device 628, such as a keyboard, mouse, digital pen, microphone, touch screen, gesture recognition system, voice recognition system, or other input device known in the art.

The memory 614 may contain computer program instructions (grouped as modules or components in some embodiments) that the processing unit 606 may execute in order to implement one or more embodiments described herein. The memory 614 may generally include RAM, ROM and/or other persistent, auxiliary or non-transitory computer-readable media. The memory 614 may store an operating system 618 that provides computer program instructions for use by the processing unit 606 in the general administration and operation of the computing system 602. The memory 614 may further include computer program instructions and other information for implementing aspects of the present disclosure. For example, in one embodiment, the memory 614 may include a user interface module 616 that generates user interfaces (and/or instructions therefor) for display upon a computing system, e.g., via a navigation interface such as a browser or application installed on the computing system 602 or the client computing system 603.

In some embodiments, the memory 614 may include a transaction processing module 620 and assured payments module 622, which may be executed by the processing unit 606 to perform operations according to various embodiments described herein. The modules 620 and/or 622 may access the data stores 630 and 631 in order to retrieve data described above and/or store data. The data stores 630 and 631 may be part of the computing system 602, remote from the computing system 602, and/or may be a network-based service. The account data store 630 may store various account data associated with user accounts maintained by the donation processing system, such as user names, passwords, payment token information, device identifiers, preferred donation recipients, transaction history, etc. The delayed transaction queue 631 may store transactions that have been temporarily delayed due to outages or errors, as described above.

In some embodiments, the network interface 608 may provide connectivity to one or more networks or computing systems, and the processing unit 606 may receive information and instructions from other computing systems or services via one or more networks. In the example illustrated in FIG. 6, the network interface 608 may be in communication with a client computing system 603 via the network 636, such as the Internet. In particular, the computing system 602 may establish a communication link 642 with a network 636 (e.g., using known protocols) in order to send communications to the computing system 603 over the network 636. Similarly, the computing system 603 may send communications to the computing system 602 over the network 636 via a wired or wireless communication link 640. In some embodiments, the computing system 602 may additionally communicate via the network 636 with a payment tokenization or vault service 601, as described above.

Those skilled in the art will recognize that the computing systems 602 and 603 may be any of a number of computing systems including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The client computing system 603 may include similar hardware to that illustrated as being included in computing system 602, such as a display, processing unit, network interface, memory, operating system, etc.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   a processor in communication with the memory and configured with processor-executable instructions to perform operations comprising:
      receiving, over a network, a plurality of transaction requests originating from client computing devices, wherein the plurality of transaction requests include at least (a) a first set of requests designated for processing via a first gateway and (b) a second set of requests designated for processing via a second gateway;
      determining that a threshold number of errors for transactions submitted to the first gateway have occurred within a threshold time period;
      based on the determination that the threshold number of errors have occurred for the first gateway, temporarily enabling delayed processing for transactions designated for processing via the first gateway;
      while delayed processing is enabled for the first gateway:
         submitting, to the second gateway, new incoming transaction requests designated for processing via the second gateway as the new incoming transaction requests are received from individual client computing devices, and placing new transaction requests designated for processing via the first gateway in a queue for delayed processing;

after a time delay, initiating an automated test transaction via the first gateway;

determining that the test transaction was successful; and based on the successful test transaction:

submitting a plurality of transaction requests from the queue to the first gateway for processing; and at least temporarily disabling delayed processing for the first gateway for subsequent transaction requests received by the computer system that are designated for processing via the first gateway.

2. The computer system of claim 1, wherein the one or more errors comprise at least one of a network communication error or a provider error.

3. The computer system of claim 2, wherein the network communication error comprises one of a network timeout, a Hypertext Transfer Protocol ("HTTP") error, or a Domain Name System ("DNS") error.

4. The computer system of claim 2, wherein the operations further comprise identifying the provider error based at least in part on a message or error code received from the first gateway.

5. The computer system of claim 4, wherein a message or error code associated with a transaction decline for lack of funds or credit card decline is not identified by the computer system as an error for consideration in enabling delayed processing.

6. The computer system of claim 1, wherein placing a new transaction request in the queue comprises storing, in an electronic data store, transaction data for the new transaction request, wherein the transaction data comprises at least two of: a transaction request time, a requesting user account identifier, a payment method identifier, an intended recipient identifier, or a payment amount.

7. A computer-implemented method comprising:

as implemented by one or more processors configured with specific executable instructions, receiving, over a network, a plurality of transaction requests originating from client computing devices, wherein the plurality of transaction requests include at least a first set of requests designated for processing via a first gateway;

identifying that one or more errors have occurred in association with transactions submitted for processing via the first gateway within a time period;

based at least in part on identification of the one or more errors, temporarily enabling delayed processing for transactions designated for processing via the first gateway, wherein the delayed processing comprises placing new transaction requests designated for processing via the first gateway in a queue for later processing instead of processing the new transaction requests at a time of receipt;

subsequent to placing a first plurality of transaction requests in the queue, initiating a test transaction via the first gateway;

determining that the test transaction was successful; and based on the successful test transaction:

submitting at least a subset of the first plurality of transaction requests from the queue to the first gateway for processing; and at least temporarily disabling delayed processing for the first gateway for subsequent transaction requests that are designated for processing via the first gateway.

8. The computer-implemented method of claim 7 further comprising:

during a time period in which delayed processing is enabled for transactions associated with the first gateway, processing a second set of transaction requests via a second gateway without delay.

9. The computer-implemented method of claim 7, wherein the test transaction is automatically initiated based on a predetermined time delay associated with the delayed processing.

10. The computer-implemented method of claim 7, wherein the delayed processing is enabled based at least in part on at least one of: trend analysis, clustering, or a machine learning model configured to analyze transactions associated with errors.

11. The computer-implemented method of claim 7, wherein delayed processing is enabled for a first transaction based at least in part on output of a machine learning model configured to accept input features associated with the first transaction.

12. The computer-implemented method of claim 11, wherein the input features comprise three or more of: a merchant, a credit card provider, a user identifier, a currency type, a country, a payment result code, a card bin number, or gateway response message data.

13. The computer-implemented method of claim 7 further comprising updating settlement information associated with the subset of the first plurality of transaction requests, wherein updating the settlement information comprises correcting a transaction date for at least one transaction stored in a database to reflect delayed processing of the at least one transaction.

14. A computer-readable, non-transitory storage medium storing computer executable instructions that, when executed by one or more computer systems, configure the one or more computer systems to perform operations comprising:

receiving a plurality of transaction requests, wherein the plurality of transaction requests include at least a first set of requests designated for processing via a first gateway;

identifying that one or more errors have occurred in association with transactions submitted for processing via the first gateway within a time period;

based at least in part on identification of the one or more errors, triggering delayed processing for transactions designated for processing via the first gateway, wherein the delayed processing comprises placing new transaction requests designated for processing via the first gateway in a queue for subsequent processing;

subsequent to placing a first plurality of transaction requests in the queue, initiating a test transaction via the first gateway;

determining that the test transaction was successful; and based on the successful test transaction, submitting at least a subset of the first plurality of transaction requests from the queue to the first gateway for processing.

15. The computer-readable, non-transitory storage medium of claim 14, wherein submitting at least the subset of the first plurality of transaction requests from the queue to the first gateway comprises submitting the first plurality of transaction requests to the first gateway indirectly via a tokenization service.

16. The computer-readable, non-transitory storage medium of claim 15, wherein submitting the first plurality of transaction requests via the tokenization service comprises sending a token representing a credit card number to the tokenization service via an application programming interface, wherein the tokenization service is configured to send a payment request to the first gateway to complete a transaction using the credit card number.

17. The computer-readable, non-transitory storage medium of claim 14, wherein the plurality of transaction requests further include at least a second set of requests for processing via a second gateway.

18. The computer-readable, non-transitory storage medium of claim 17, wherein the operations further comprise, during a time period in which delayed processing is enabled for transactions associated with the first gateway, processing a second set of transaction requests via the second gateway.

\* \* \* \* \*